Aug. 20, 1968　　　O. V. JOHNSON　　　3,398,398
LOW PRESSURE INDICATOR FOR VEHICLE TIRES
Filed Oct. 4, 1965
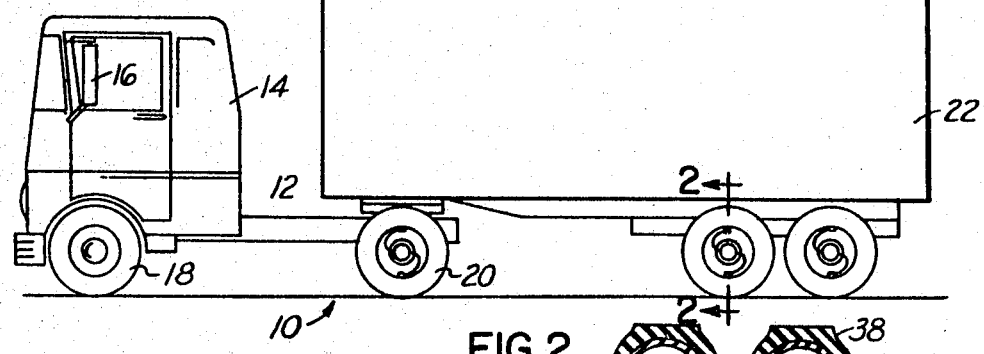
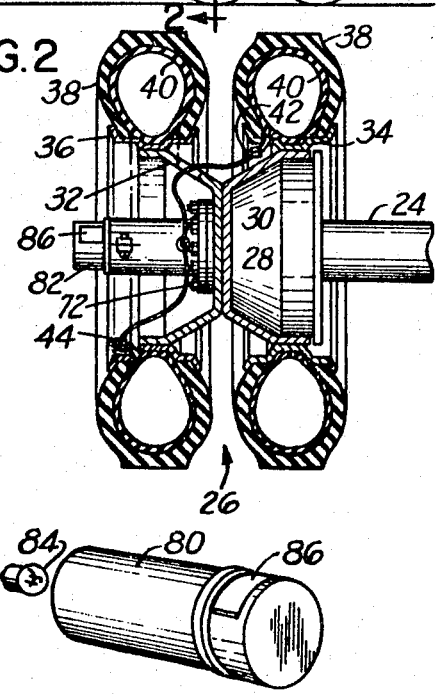
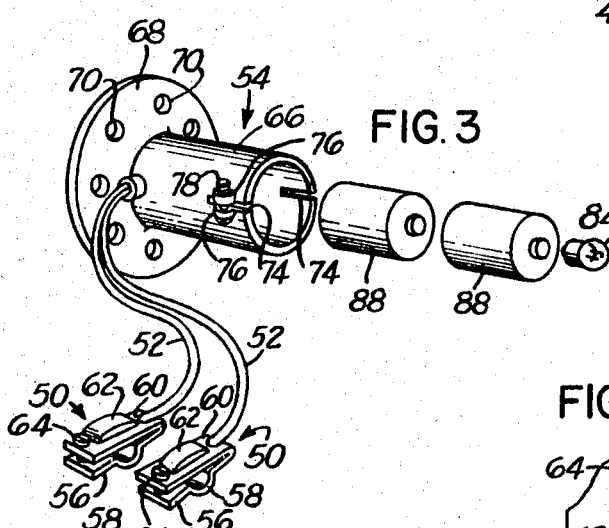
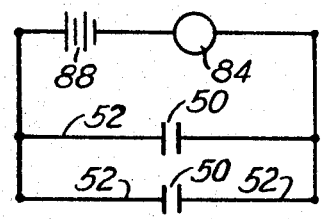
OSCAR V. JOHNSON
INVENTOR.
BY
*John C. Thompson*
ATTORNEY

# United States Patent Office 3,398,398
Patented Aug. 20, 1968

3,398,398
**LOW PRESSURE INDICATOR FOR
VEHICLE TIRES**
Oscar Vernon Johnson, 420 E. Pearl St.,
Geneseo, Ill. 61254
Filed Oct. 4, 1965, Ser. No. 492,398
9 Claims. (Cl. 340—58)

ABSTRACT OF THE DISCLOSURE

A low pressure indicator for vehicle tires comprising a light adapted to be mounted on a vehicle wheel. The light is normally in an off condition but is turned on by a pressure sensitive switch. The switch is mounted on a valve stem and is normally held away from the inner rim of the wheel by the pressure within the tire, however the switch is caused to contact the rim if pressure within the tire drops.

---

The present invention relates generally to an alarm system and more particularly to systems for detecting and signalling the loss of pressure in pneumatic tires of vehicles employing dual tired wheels.

In vehicles employing dual tire wheels, and particularly large semi-trailer trucks and buses which travel long distances at high speeds without stopping, the loss of pressure in one of the tires is not desirable. One of the consequences of driving a vehicle with low pressure in one of the dual tires is rapid tire wear, not only in the tire which has maintained its pressure and is therefore carrying a greater part of the load, but also in that tire which has lost pressure. Continued driving will frequently cause the partially inflated tire to be literally beaten into pieces and thus it is not uncommon to see chunks of tires along the super highways of today. Another consequence of driving with one tire flat, or substantially so, is that frequently heat will build up in the weel to such an extent that the tires may start to burn.

Prior art alarm systems have been developed to indicate to the driver of a vehicle that one of his tires is low on air. However the prior art alarm systems have never achieved any appreciable commercial success since they have generally been fairly complex and therefore both costly and unreliable. Many of the prior art systems rely on pressure sensing equipment in communication with the air in the tire. Other systems have required special tire constructions for the detection of low pressure. Furthermore, the signals of the prior art systems have either been bells or buzzers mounted on the wheels or audible or visual means within the cab of the vehicle. The wheel mounted bells and buzzers are not desirable in that it is frequently hard to hear them, particular when travelling at high speeds. The disadvantages of the cab mounted signals is that either wiring must be provided between the cab and the wheels or radio transmitters must be employed.

It is therefore an object of this invention to provide an alarm system for vehicle tires which overcome the disadvantages of the prior art systems.

More particularly it is an object of this invention to provide an alarm system including a switch which is mounted on the valve stem of a tire and which is closed when the stem moves toward the rim of the wheel when air pressure is lost within the tire as the tire revolves, and a signal light which is mounted on the hub of the wheel and which projects beyond the tire and is observable through the rear view mirror of the vehicle.

Another object of this invention is to provide for a wheeled vehicle having a valve stem for a pneumatic tire disposed radially inwardly of the rim of the wheel but movable toward the wheel upon loss of air pressure within the tire a switch mountable upon the valve stem to control signal means carried by the vehicle in response to movement of the valve stem towards the rim.

A further object of this invention is to provide for a vehicle having a rear view mirror, an alarm light mountable upon a wheel and visible through the rear view mirror, the light being controlled by switch means which are responsive to loss of air within the tire.

A still further object of the invention is to provide a pneumatic tire trouble indicator which is low in cost, reliable in operation, and simple to install and service.

These and other objects and advantages will be apparent from the following description taken in conjunction with the accompanying drawings in which a preferred form of this invention is illustrated.

FIG. 1 is a view of a semi-trailer truck in which the alarm system of this invention has been incorporated.

FIG. 2 is an enlarged view taken along the line 2—2 in FIG. 1.

FIG. 3 is an enlarged perspective view showing the signal transmitter and switch of this invention.

FIG. 4 is an enlarged sectional view showing a switch mounted upon a valve stem of a pneumatic tire.

FIG. 5 is a diagram of the electrical circuit of the alarm system of this invention.

Referring first to FIG. 1 a semi-trailer truck is illustrated in which the present invention is incorporated. The truck, which is indicated generally at 10, includes a tractor 12 which is provided with an operator's station or cab 14. As is customary the cab has right and left hand mirrors, only the left mirror 16 being illustrated. The tractor is supported by front steerable wheels 18 and a pair of rear dual tired wheels 20. The trailer 22 is supported at its forward end on the rear end of the tractor, and at its rear end on a pair of axles 24, each of which carries at opposite ends dual tired wheels 26.

Each dual tired wheel, as can best be seen from FIG. 2 is formed in the conventional manner having a central hub portion 28 with inner and outer radially extending flanges 30, 32, respectively which carry inner and outer annular rims 34, 36, respectively. Each rim in turn carries the customary tire 38 and tube 40. It should be noted that the wheel illustrated is merely representative and that, in fact, many different forms of dual wheels are in use today. However all of these wheels are formed with annular rims for the reception of tires. Each tire is provided with a valve stem, the inner one being shown at 42 and the outer one at 44. These stems are normally disposed parallel to but inwardly of the radially inner surface 46 of the wheel rim.

Applicant has observed in vehicles of the class described that during normal operation the valve stem will be held away from the radially inner surface of the rim if the tire is properly inflated, but if the tire should become under-inflated that during rotation of the wheel the valve stem will move towards the inner surface 46 of the rim. Applicant's alarm system utilizes this movement for the detection of loss of air pressure.

According to this invention a pressure sensitive switch, indicated at 50, is mounted on each valve stem, each switch being connected through an electrical wire 52 with a visual alarm device.

The switch 50 includes a mounting plate 56, which is formed with a hemicylindrical surface 58 which is disposable about the valve stem 42 or 44, and a portion 60 which carries a pressure responsive contact button 62 for closing an electrical circuit. The mounting plate 56 is secured to the portion 60 by means of conventional fasteners 64.

The visual signal device 54 includes a first cylindrical member 66 which has at one end a flange 68 which is provided with a plurality of apertures 70 that are adapted to receive fasteners 72 by which the first cylindrical member and the hub 28 are secured to the axle of the vehicle. The other end of the first cylindrical member is provided with two spaced apart clamping slots 74 and spaced apart ears 76 disposed on opposite sides of each slot and which in turn receive a screw 78 for clamping the first cylindrical member about a second cylindrical member 80.

The second cylindrical member 80 carries within one end portion 82 an electric light 84, the end portion being apertured at 86 whereby the light may be seen. The end portion preferably carries a clear lens within the aperture 86 to protect the light bulb 84 from gravel and other objects found along the highways which might otherwise cause the light to be broken. The first and second cylindrical portions are so sized that the apertured light portion will project outwardly of the tire.

Dry batteries 88 of the type normally employed within flashlights are disposed within the second cylindrical member in electrical cooperation with the light bulb 84 and the electrical wires 52, the batteries being adapted to power the light 88 in response to movement of the switch towards the rim 46.

It should be obvious from the foregoing description that with the alarm device mounted upon the hub and with the switches mounted upon the valve stems in the manner set forth above that during operation of the vehicle if one of the tires should lose air that the switch will make contact with the rim 46 closing an electrical circuit whereby the light bulb 84 will be lighted, the light being visible to the operator of the vehicle through the rear view mirror on the side of the vehicle having the low pressure tire. To aid the operator see the light the end portion is so apertured that the light is only occasionally visible during the revolution of the wheel, as for example once.

To test the signal device it is only necessary to press the valve stem and switch against the rim of the wheel. If the light lights then the operator knows the assembly is in working order.

While the preferred structure in which the principles of the present invention have been incorporated is shown and described above, it is to be understood that the invention is not to be limited to the particular details shown and described above, but that, in fact, widely different means may be employed in the practice of the broader aspects of this invention.

I claim:

1. In an apparatus of the class described including a vehicle wheel having a hub and an annular rim disposed concentrically about said hub, a pneumatic tire mounted on the radially outer surface of the rim, a valve in communication with the interior of said pneumatic tire, a portion of said valve being disposed along a radially interior portion of the rim; the combination therewith of an electric light mounted upon said hub, a source of electric power, and electric circuit closing means interconnected with said valve and in communication with said source of electric power and said electric light for initiating and interrupting a flow of current to said light from said source upon movement of said valve towards and away from said rim in response to pressure variations within said tire.

2. The combination of a vehicle, wheel means mounted upon the vehicle, pneumatic tire means mounted upon the wheel means, means for sensing the loss of air pressure within a pneumatic tire, a visual signal device mounted on the wheel and projecting outwardly of said tire and responsive to said sensing means, an operators station on said vehicle, and a rear view mirror mounted adjacent the operators station through which the signal may be perceived by the operator of the vehicle.

3. The combination set forth in claim 2 in which the visual signal device includes an electric light mounted concentrically within the wheel and projecting outwardly beyond the tire.

4. The combination set forth in claim 3 further characterized by the provision of electric batteries mounted concentrically within the wheel and adapted to power said light.

5. The combination of a vehicle, wheel means including a hub portion and a rim portion concentric to said hub, pneumatic tire means mounted upon a radially exterior portion of said rim means, a valve in communication with the interior of said pneumatic tire, at least a portion of said valve being disposed along a radially inner portion of said rim, means for sensing the loss of air pressure within said pneumatic tire means including a pressure sensitive switch mounted on said valve and movable towards said rim upon loss of pressure within the pneumatic tire means, a visual signal device mounted on said hub and projecting outwardly of said tire and responsive to said pressure sensitive switch, an operators station on said vehicle, and a rear view mirror mounted adjacent said operators station through which the signal may be perceived by the operator of the vehicle.

6. The combination set forth in claim 5 in which the visual signal device comprises an electric light mounted on said hub and projecting outwardly of said tire, an electric battery means carried concentrically with said light and adapted to power said light.

7. A signal light assembly adapted to be mounted upon the hub of a wheel for use in signalling low pressure in pneumatic tires comprising: a generally cylindroidal housing in which dry cell battery means may be mounted, an electric light mounted within said housing, one or more opening within the housing through which the light may be perceived during rotation of the wheel, and means adapted to secure said cylindroidal housing to said hub.

8. An apparatus adapted to be mounted upon the hub of a wheel for use in signalling low pressure in pneumatic tires comprising: pressure sensitive switching means mountable upon the valve stem of a pneumatic tire, a cylindroidal housing in communication with said switching means and adapted to receive battery means, means to secure said cylindroidal housing to the hub mounted on one end of said housing and including an apertured radial flange, and a light mounted within the other end of the cylindroidal housing, said housing being provided with apertures through which the light may be occasionally perceived during rotation of the housing.

9. In an apparatus of the class described including a vehicle wheel having a hub and an annular rim disposed concentrically about said hub, a pneumatic tire mounted on the radially outer surface of the rim, a valve in communication with the interior of the pneumatic tire, a portion of said valve being disposed along a radially interior portion of the rim; the combination therewith of means for sensing the loss of air pressure within said pneumatic tire means including a pressure sensitive switch mounted on said valve and movable towards said rim upon loss of pressure within said pneumatic tire means, and a visual signal device mounted on said hub and projecting outwardly of said tire and responsive to movement of said pressure sensitive switch.

References Cited
UNITED STATES PATENTS 1,772,138   8/1930   Gartner _____ 340—58

JOHN W. CALDWELL, *Primary Examiner.*

ALVIN H. WARING, *Examiner.*